Figure 1:
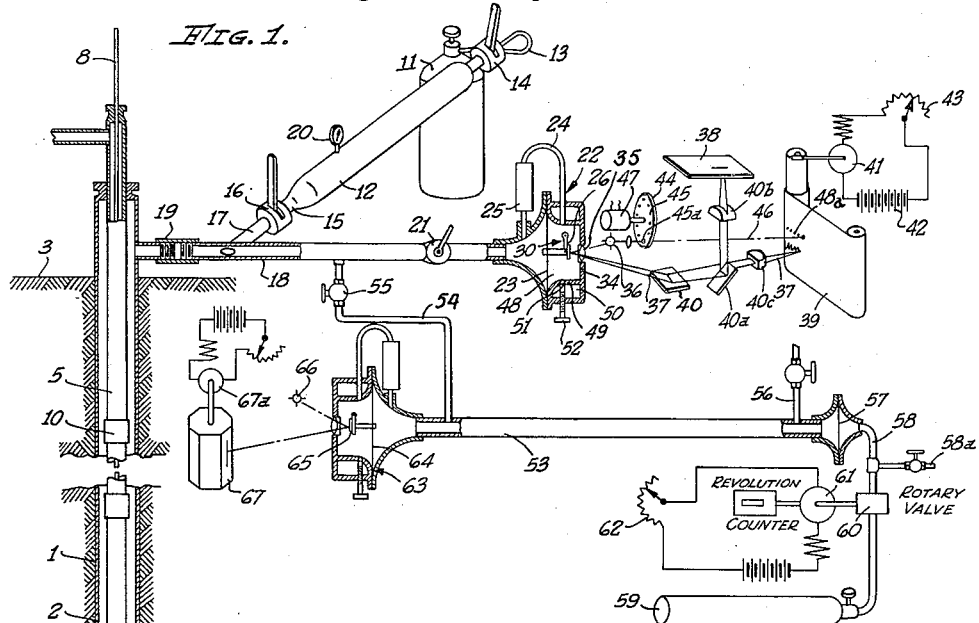
Figure 1:
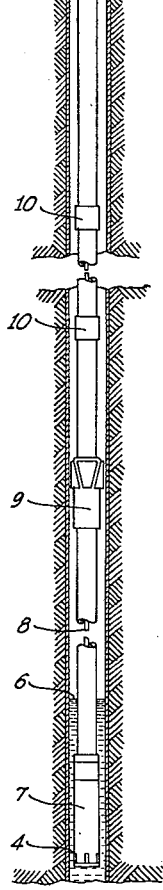

July 30, 1940.　　　　　C. P. WALKER　　　　　2,209,944

METHOD OF MEASURING LOCATION OF OBSTRUCTIONS IN DEEP WELLS

Original Filed Sept. 7, 1937

INVENTOR.
CRANFORD P. WALKER
BY
ATTORNEY.

Patented July 30, 1940

2,209,944

UNITED STATES PATENT OFFICE

2,209,944

METHOD OF MEASURING LOCATION OF OBSTRUCTIONS IN DEEP WELLS

Cranford P. Walker, San Marino, Calif.

Division of application September 7, 1937, Serial No. 162,699, now Patent No. 2,156,519, dated May 2, 1939. Continuation of application April 29, 1939, Serial No. 270,865. Divided and this application September 25, 1939, Serial No. 296,781

9 Claims. (Cl. 181—0.5)

My invention relates to a method of measuring the location of obstructions in deep wells such as oil wells and has particular reference to methods for determining the location below the ground surface of the liquid level in the well, or the location of tools, pipe sections, couplings or other devices which constrict the well bore.

This is a division of my copending application Serial No. 162,699, filed September 7, 1937, which has issued as United States Letters Patent No. 2,156,519 on May 2, 1939, and a continuation of my application Serial No. 270,865, filed April 29, 1939, wherein is described and claimed apparatus for measuring the location of obstructions and means for producing pressure wave echoes in which the echoes from certain of the obstructions are accented so as to make them more readily distinguishable.

During the active life of an oil well it is desirable from time to time to determine the location of the fluid level within the well for the purpose of determining the type of pumping apparatus most desirable to be used, determining the rate of flow of oil into the well, and for making other determinations desirable in the most efficient operation of the well.

Prior methods of determining the location of the fluid level or the location of other obstructions in the well have been generally of two types, one in which measuring apparatus has been lowered from the ground surface to determine by the length of cable or the line extended into the well the depth or location of the fluid or other obstructions encountered by the instrument as it is lowered. Among devices to be lowered into the well is also included a pressure recorder which may be lowered into the well on a wire, the length of which is metered to determine the static pressure in the well at different levels, a variation of which includes a pressure recorder with a clock driven chart lowered on the bottom of the pump to obtain a record of the operating pressures or levels of the fluid. A further variation is that of lowering a bailer upon a rope and either measuring the wetted surface of the rope or repeatedly lowering the bailer until it brings up fluid, measuring the length of the line upon such occurrence. The other method is that of producing sound waves in the well and noting the elapsed time between the introduction of the sound and its return as an echo from the surface of the liquid or other obstruction encountered.

Neither of these methods is satisfactory, the first having the disadvantage of requiring the removal of oil flow tubing, sucker rods and other apparatus normally disposed in the well prior to the time the instrument is inserted in and lowered into the well, requiring a considerable length of time both for the removal of such apparatus, the reinsertion of the apparatus, and the making of the actual measurement. The other method is unsatisfactory primarily because of the relatively low intensity or energy which can be employed in the sound wave so that the echo received back is of such low energy as to prevent its accurate detection and, further, little or no distinction is made by reason of such low energy between various types of obstructions encountered by sound waves.

A third method, namely, that of introducing a shock of relatively high intensity into the well, creating thereby a pressure wave which travels through the well, and measuring the elapsed time between the introduction thereof and the echo thereof, to give an indication of the depth of the fluid level and other obstructions, has been introduced, one form being that of creating a relatively loud noise such as a shot or an explosion in the well, another form being illustrated and described in United States Letters Patent No. 2,047,974, issued to Harold J. Wyatt and Paul E. Lehr on July 21, 1936. This latter method has the desirable characteristic of permitting the employment of relatively high intensity in the wave or impulse produced in the well and it is an object of my invention to improve upon the method disclosed in that patent and to eliminate or materially reduce factors of error encountered in the employment of that method.

Another object of my invention is to provide a method of measuring the location of fluid level or other obstructions in well bores, in which the intensity of the pressure impulse introduced into the well may be varied to compensate for well depth and the character of the gaseous media through which the wave must travel to produce an echo of sufficient intensity to permit the same to be readily detected and translated.

Another object of my invention is to provide a method as set forth in the preceding paragraph wherein the pressure impulse may be so varied as to allow the detection and the separate determination of the location of a plurality of obstructions which may be encountered in the well.

Another object of my invention is to provide a method for the measurement of the location of fluid level or other obstructions in a well bore in which the pressure impulse introduced into the well produces an indication both of the fluid level and of the location of other obstructions in the well bore.

Another object of my invention is to provide a method of the character set forth in the preceding paragraph wherein the same pressure impulse introduced into the well to measure the fluid level or the location of other obstructions is employed to determine the velocity of the wave in the particular media encountered in the well.

Another object of my invention is to provide a method as set forth in the preceding paragraph wherein, knowing the location of one or more obstructions, tools or other devices in the well bore, the velocity of the wave within the well bore may be accurately determined from echoes produced thereby and enabling an operator to determine the unknown location of the fluid level by the mere measure of the elapsed time between the introduction of the impulse into the well and the reception of a distinguishable echo from the fluid level, without necessitating introduction of corrective factors or other separate measurement of and determination of the character of the media in the well.

Another object of my invention is to provide a method for determining the location of fluid levels in well bores in which the location of and the number of tubing sections in the well may be determined by the same pressure wave created to measure the depth or the location of the fluid level.

Figure 2:
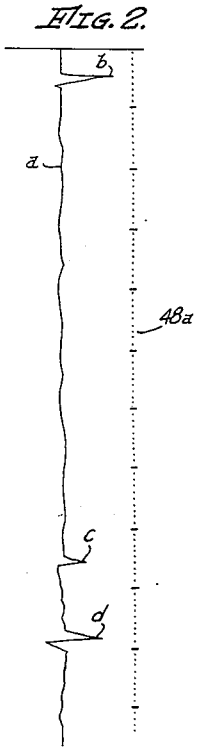
Figure 3:
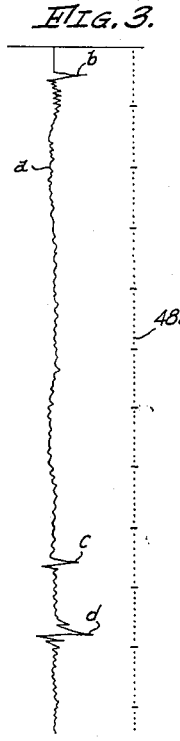
Figure 4:
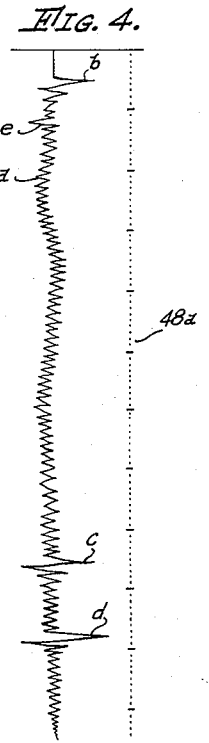

Other objects of my invention will be apparent from a study of the following specification, read in connection with the accompanying drawing, wherein Fig. 1 is a diagrammatic view illustrating a typical well cross section and the location and character of the apparatus required for determining the fluid level or location of other obstructions in the well in accordance with my method;

Fig. 2 is a diagrammatic view illustrating the type of record or indication which may be made with my method in its simplest application;

Fig. 3 is a diagrammatic view similar to Fig. 2 and illustrating the type of record or indication which may be made with my method but in which echoes produced by intermediate obstructions are not amplified; and Fig. 4 is a diagrammatic view similar to Figs. 2 and 3 and illustrating the type of record or indication which may be made with my method, including the amplification of echoes from intermediate obstructions.

The method disclosed in United States Letters Patent issued to Wyatt and Lehr, hereinbefore referred to, is briefly that of introducing into a well bore a pressure impulse, either positive or negative, which may have any desired frequency as by the introduction into the well of a quantity of gas of known pressure and volume, the introduction of this impulse into the well producing a wave which will travel down the well until it encounters the fluid surface in the well and then the wave will be reflected and will travel back up the well to the ground surface where the echo or return wave may be detected, the measurement of the elapsed time between the production of the impulse and the arrival at the ground surface of the echo constituting a measure of the location of the fluid level by the simple calculation of the elapsed time multiplied by the rate of travel or the velocity of the wave in the well. In making such calculations, it is correctly assumed that the wave will act like an acoustical wave and its velocity will be the same as that of a sound wave. In air at normal temperatures and approximately sea level pressures, this rate would be 1100 feet per second but the gaseous content or media in the well is ordinarily not the same as air and correction must be made for the density, temperature or other characteristics of the particular media encountered in the well, it being well known that the higher the temperature or the lower the density of the gaseous media through which the impulse travels, the greater the velocity of the wave.

In employing the method as set forth in the said patent, an approximation of the fluid level may be readily determined and this approximation or measurement may be determined in a relatively short length of time, without requiring the removal or disturbance of any of the apparatus contained within the well bore. However, to determine the fluid level with considerable accuracy, the rate of travel of the wave in the particular media encountered in any particular well must be known or must be determined since the density, temperature and character of the gaseous media in wells varies in each different oil field and in each individual well. I provide means for readily determining the pressure wave velocity in any particular well, which may be arrived at as follows:

In Fig. 1, I have illustrated a typical oil well comprising the earth bore 1, usually lined with casing 2 or pipe of relatively large diameter, extending from the ground surface at 3 to the oil bearing sands at 4 where the casing is either perforated or is provided with a perforated liner through which the oil from the sands may enter to the interior of the casing. The casing is, of course, constructed of a plurality of lengths of pipe secured together by couplings or collars in any well known manner. A second pipe or string of pipes extend down through the casing 2, this string of pipe being known as the oil flow tubing, indicated at 5, extending from the ground surface down to a position disposed below the level of the fluid in the well, which is indicated at 6, the lower end of the tubing string 5 having a pump 7 of any desired character located therein. Such pumps are usually operated by means of a string of sucker rods 8 which extend upwardly through the tubing string 5.

It is the common practice to employ in the tubing string 5 a tubing catcher 9 which may be of any of the well known constructions, the tubing catcher being usually located a relatively short distance above the level of the pump in the well so that should the tubing string break the tubing catcher 9 will grip the casing and prevent complete destruction of the tubing string. One or more of the tubing catchers 9 may be distributed throughout the length of the tubing string 5.

The tubing string 5 is constructed of a plurality of lengths of pipe coupled together by means of collars 10, which collars are usually of somewhat larger outside diameter than the outside diameter of the tubing from which the oil flow tubing is made.

Hence it will be noted that in the ordinary oil well there are a plurality of obstructions, each of which is capable of receiving and reflecting a sound wave or pressure wave passing down through the well, these obstructions including the fluid surface 6, the tubing catcher 9 and each of the collars 10 of the tubing string.

In most wells the length of the tubing string between the ground surface 3 and the pump 4 is known, that is, records are usually kept showing the length of each tubing string section and the number of such sections located within any given well. Particularly, records are usually kept as to the location along the tubing string of the catcher 9 so that by referring to these records an absolute calculation or determination of the distance between the ground surface and the tubing catcher or liner top is known. Hence to determine the location of the fluid level 6, it is only necessary to produce in the well a pressure impulse which will create the low frequency wave, and then translate the echoes received from the well in terms of echo impulses received from the tubing catcher or liner top and from the liquid surface. By comparing the time lapse between the production of the pressure impulse and the receipt of the echo from the tubing catcher with the time lapse between the creation of the pressure impulse and the receipt of the echo from the fluid surface, a positive and accurate measurement of the location of the fluid level may be obtained. That is, if the known location of the tubing catcher is 5000 feet below the ground surface and it is desired to know the height of the fluid in the well, all that is necessary is to produce a pressure impulse, note or record the echo from the tubing catcher, and note or record the echo received from the fluid surface.

The time lapse between the creation of the pressure impulse and the receipt of the echo from the tubing catcher denotes the velocity of the pressure wave in the particular media encountered in that particular well so that by measuring the additional elapsed time between the receipt of the echo from the tubing catcher and the receipt of the echo from the fluid surface, an accurate measurement may be obtained and no compensation need be made for possible errors due to different velocities of waves in different media because the mean velocity of the wave from the ground surface to the tubing catcher and return is the same as the mean velocity of the wave from the ground surface to the fluid surface and return.

The only item which must be provided for is that of producing a pressure wave echo of such magnitude and of such character that the echo from the tubing catcher can be distinguished from the echo received from the fluid surface.

As illustrated in Fig. 1, this distinction may be readily made by providing a suitable source of fluid pressure indicated at 11 which may be a tank, compressor or other source of fluid pressure at any desired value. It follows, of course, that the pressure impulse which must be produced in the well must be at a greater pressure than the pressure of gases in the well so that the pressure source 11 must be capable of delivering a pressure impulse having a considerable differential over the static pressure of gases in the well or flowing therefrom. For example, if the well gases at the surface of the well are at a pressure of 500 pounds per square inch, the source of fluid pressure 11 must be capable of delivering, say, 600 pounds per square inch or more in order to create a pressure impulse of, for example, 100 pounds pressure differential.

The pressure source 11 is illustrated as being coupled to a pressure chamber 12, one end of which is connected as by means of tube 13 and valve 14 to the pressure source 11, while the opposite end of the pressure chamber 12 is connected by means of a nipple 15, a quick opening valve 16 and a nipple 17 to a length of pipe 18 which is in turn coupled as indicated at 19 to the well casing 2. The pressure chamber 12 is preferably provided with a suitable indicating pressure gage 20 by which the pressure within the pressure chamber 12 may be readily measured. Thus for the production of the pressure wave all that is necessary is to close valve 16, open valve 14 and allow pressure to be built up in the pressure chamber 12 to the desired pressure value, say, 600 pounds per square inch. Then the valve 14 is closed and valve 16 opened, allowing an impulse of 600 pounds per square inch to be injected into the well casing (the static pressure in which is, for example, 500 pounds per square inch).

A receiving device for receiving and registering the echoes of the pressure impulse from the various obstructions within the well is illustrated as including the pipe 18 and pressure responsive device coupled thereto through a valve 21 to a diaphragm chamber 22, permitting a flexible diaphragm 23 to be placed into communication with the casing 2 whenever the valve 21 is opened. To control the sensitivity of response of the diaphragm 23 and in order to prevent undue distortion of the diaphragm 23 by the static pressure in the well and to avoid damage which would result therefrom, I prefer to allow the static pressure in the well casing 2 and pipe 18 to be equalized on both sides of the diaphragm 23 as by providing a by-pass 24 providing a restricted passage through which gas pressure in the chamber 22 on one side of the diaphragm may pass to the opposite side of the diaphragm, the filter 25 being interposed in the by-pass if desired to dry out the gas and prevent undue corrosion of the more delicate parts of the device contained in the diaphragm chamber 22. Attached to the diaphragm 23 is a mirror 26. In the front wall 34 of the diaphragm chamber 22 I mount a lens 35, through which light from a suitable light source 36 may pass into the chamber 22 to be reflected by the mirror 26, the reflected beam 37 passing back through the lens 35, as a ribbon beam which may be reflected or directed upon a ground glass screen 38 and upon a recording chart or strip of sensitized tape 39 to make a permanent record of the path described by the light beam 37. Suitable reflectors, such as indicated at 40, may be employed to direct the beam in any desired direction while a reflector 40a may be interposed in a portion of the ribbon beam 37 to direct a portion thereof upon the screen 38, suitable condenser lenses 40b and 40c being interposed in the beam to draw the same to a point beam upon the screen 38 and tape 39.

Thus as the pressure within the casing 2 is varied as by the pressure wave resulting from the pressure impulse created within the casing 2, the mirror 26 will be moved, the amplitude of its movement representing the amplitude of the pressure variation. As the echo of the pressure impulse from any obstruction within the well is received upon the diaphragm 23, the mirror 26 will be moved in accordance with the amplitude of the echo impulse and will cause the echo impulses to be registered for observation, both by directing the light beam 37 upon the ground glass 38 where the amplitude of the echo may be visually observed and by directing the light beam 37 upon the recording tape 39, a permanent record of the pressure wave which is created within the casing 2 may be made and this wave or chart will show peaks of varying amplitude, each of which peaks represents an echo from a particular obstruction within the well, either the tubing collars 10, the tubing catcher 9 or the fluid surface 6.

The sensitized strip 39 may be arranged to be driven at any desired speed by means of a variable speed motor 41 coupled to a suitable source of current 42 through a rheostat or other speed adjusting device 43 so that the tape or strip 39 may be driven at variable speeds.

By employing some device which will produce upon the record strip 39 a time lapse measurement, a direct comparison between the path described by the light beam and the lapse of time may be accomplished. I prefer to provide such mechanism including means for producing upon the strip 39 a series of dots or marks, each of which represents a fraction of a second, the line of dots or marks extending substantially parallel to the general direction of the wave chart described by the light beam 37. This may be readily accomplished by providing a disc 44 having a plurality of openings 45 therein adapted to be rotated in the path of a secondary light beam 46 emanating from the light source 36. The light beam 46 passing through the openings of the disc 44 may be projected upon the same sensitized strip 39 to describe a series of marks thereon, one for each of the openings 45.

One of the openings 45a is preferably larger than the remainder so that upon each revolution of the disc 44 a distinguishing mark will be produced. Thus by providing ten openings 45, a series of marks 48a may be produced upon the record strip 39 representing ten equal divisions. The tenth mark being produced by the large opening 45a is of greater length or of greater size or in some other manner distinct from the remaining nine marks. By providing the disc 44 with any suitable time mechanism such as a synchronous motor 47, the marks produced upon the charts will represent lapse of time; for example, each mark representing $\frac{1}{10}$ of a second while the space between the distinct marks will represent lapses of one second each.

Due to the fact that the depth of wells varies considerably and, further, due to the fact that conditions of obstruction or constriction of the space between the well casing 2 and the tubing string 5 varies considerably in different wells, the same pressure differential cannot be used successfully in all wells and it is necessary to vary the pressure impulse through considerably wide limits, dependent upon the conditions encountered at a particular well. For this reason I prefer to direct a portion of the beam 37 upon the ground glass screen 38 so that by firing one charge of gas pressure into the well and observing the path described by the light beam, a determination of whether or not the correct pressure impulse is being used may be made. For example, one pressure impulse which is estimated to be correct for a given well may not produce a sufficient fluctuation in the echo waves received from the tubing catcher and the fluid surface, and a higher pressure or greater quantity of gas must be used in order to create the desired impulse. Thus by observing the effect of a succession of pressure impulses liberated into the well, the person making the survey will be able to determine which of the echoes rebounds from the tubing catcher and which of the echoes rebounds from the fluid surface and thus determine when distinguishable echoes are being received from the different obstructions in the well.

The typical desired configuration of the path described by the light beam 37 is indicated in Fig. 2 wherein a represents the path described by the light beam as a result of the pressure wave created by a discharge of gas from the chamber 12 into the well casing. From an inspection of the line a, it will be noted that this line is a relatively straight but somewhat wavy line, having distinct peaks at b, c and d. The peak b is that which will be produced by the deflection of the diaphragm 23 when the impulse of gas from the chamber 12 is liberated into the casing 2. At a predetermined time thereafter, dependent upon the velocity of the wave in the particular well, a peak c will be produced as a reflection from the tubing catcher 9, while at a predetermined time thereafter an additional peak or series of peaks will be produced at d as a reflection of the wave from the fluid surface.

Thus by observing the effects of a series of pressure impulses of different intensity or pressure, the operator may determine which impulse is most desirable to produce the distinctly recognizable and differentiatable peaks c and d, allowing him to differentiate between echo from the tubing catcher (or such other obstructions as may be known to be in the well) and the echo from the fluid surface. As hereinbefore stated, knowing the depth or location of the tubing catcher 9, the comparison of the elapsed time between the peaks b and c and the elapsed time between the peaks b and d, an accurate determination of the fluid level may be produced.

After the most desirable magnitude of pressure impulse has been determined, the motor 41 may be set into action and a permanent record of the path described by the light beam may be made upon the sensitized film 39 with assurance that the various peaks b, c and d will be readily distinguishable upon the diagram so produced.

As will be observed from an inspection of Fig. 2, the diagram on the strip 39 also shows the plurality of spaced dots or other means of indicating elapsed time, such series of dots being indicated at 48a.

Having made a diagram as indicated in Fig. 2, a direct measure and determination of the fluid depth may be achieved. Also it will be observed that by selecting impulses of the desired magnitude, reflections from other obstructions in the well may be noted and recorded, thus assisting in the location and determination of other restrictions as well as a measurement of the fluid level.

For example, each of the collars 10 of the tubing string will produce a distinct echo differentiatable from the echoes from other sources. This allows the accurate measurement of the fluid level in a well where, by reason of failure to keep records or loss of records, the location of the tubing catcher is not known or wherein the catcher is submerged or is omitted. For example, in some wells tubing has been drawn out and replaced by other tubing and no record has been made of the lengths of tubing drawn out or the lengths of each section drawn out or the lengths or number of tubing sections employed to replace them so that to merely compare the time distance between the peaks b and c would not give a true indication of the velocity of the wave in the particular well. However, if it is reasonably assured that each of the tubing lengths is approximately the same, and the usual practice in oil wells is to employ tubing lengths in a given well, all of which are approximately the same, an indication of the number of tubing lengths located within any given well, multiplied by the average length of a tubing section, will give a true measure of the location of the tubing catcher or the location of the pump or other device which constitutes an obstruction in the well. For example, by selecting a desired pressure impulse, by comparison of a succession of pressure impulses and the waves produced thereby, upon the ground glass 38, a wave or line of the character indicated at $a$ in Fig. 3 may be produced wherein, though it is still wavy, it is produced by a series of peaks $e$. By counting the number of these peaks, each of which represents a reflection back from a collar 10, the number of lengths of tubing between the peaks $b$, $c$ and $d$ may be determined.

However, in actual practice it is found that irregularities in the annular space between the tubing and the casing, such as may be caused by imperfect abutment of adjacent casing sections or the presence of tubercules upon either the casing or the tubing will produce undesired echoes and will produce upon the record chart peaks which cannot readily be distinguished from those resulting from the echoes from the tubing collars, and I prefer therefore to provide some means which will be so tuned with the tubing collar echoes as to amplify or accent them and which will tend to dampen or filter out the undesired disturbance vibrations. As will be understood by those familiar with acoustics, if upon the multiplicity of sound waves emanating from the well as a result of the desired echoes and the disturbances there is superimposed another wave so tuned to the desired echo wave as to beat with it, the desired wave will be amplified and accented while the other or disturbance waves will tend to be damped out.

By selecting the correct length for the pipe 18, that is, by selecting the correct distance between the casing 2 and the diaphragm 23, a tuned wave may be produced which will affect the movements of the diaphragm 23. Since it is desired to count the number of tubing collars, all that is necessary is to lengthen or shorten the pipe 18 until it is tuned to one of the harmonics of the impulses or echoes produced by the collars 10. From experience it has been found that selection of the pipe 18 of approximately one-third of the length of a section or joint of the tubing 5, a third harmonic is produced which beats with the impulses echoed from the tube collars 10 to produce magnified or amplified peaks $e$ and permits the ready distinguishing of the impulses produced by the collars 10 from other impulses.

I prefer, however, to employ in the length of the pipe 18 an adjustable coupling 19 which allows the accurate lengthening or shortening of the pipe 18 until, by observing the path of the light beam upon the ground glass 38, a distinct pattern is made represented by the line $a$ on Fig. 4, in which each of the intermediate peaks $e$ is amplified as indicated in Fig. 4 so that it is readily recognizable.

The adjustment of the coupling 19 should be made until, with a given pressure impulse, a uniform deflection of the mirror 26, that is, a uniform amplitude of the peaks $e$, is achieved, and by observing this upon the ground glass 38 the operator will note when the pipe 18 is of such length as to be "tuned" with the tubing lengths.

Thus, even though the location of the tubing catcher is not known, if the average length of tubing section is known, the production upon the strip 39 of a diagram such as shown in Fig. 4 allows the counting of each of the collars 10 and a clear understandable record is made of the length of tubing string between the impulses $b$, $c$ and $d$, permitting the quick and accurate location and determination of the exact level of the fluid in the well.

As is described and claimed in my copending application Serial No. 270,866, filed April 29, 1939, an elongated tube or pipe 53 coupled as by means of a short pipe 54 to the pipe 18 and controlled by a valve 55 in such manner as to permit gas from the casing 2 to flow through the pipe or tube 53, thus providing in the pipe 53 an atmosphere corresponding to the atmosphere or gaseous medium in the casing 2. An open exhaust pipe 56 leads from the opposite end of pipe 53 open to the atmosphere or connected to a gas flow line so that the pressure within the pipe or tube 53 will remain substantially constant as of the value of the gas in the casing 2. Near one end of the tube 53, a diaphragm 57 may be provided and arranged to be vibrated at any desired frequency as by coupling the diaphragm 57 by a pipe 58 open to the atmosphere at 58a, to a source of fluid pressure, such as compressed air, indicated at 59. A rotary valve 60 is interposed in the pipe 58 and arranged to be driven by means of a variable speed motor 61 regulated as to speed by means of a suitable rheostat or other controlling device 62 so that by rotating the motor 61 at any speed a series of pressure impulses will be created in the pipe 58, and will beat upon diaphragm 57 to create a pressure wave in the tube or pipe 53 of known frequency, the frequency being variable by varying the speed of motor 61.

At the opposite end of the pipe 53 I couple a pressure responsive device which may be constructed in the same manner as the diaphragm chamber 22 and diaphragm 23 hereinbefore described. This pressure responsive device is illustrated at 63 coupled directly to the end of the pipe 53, the diaphragm 64 of which receives the impulses transmitted through the pipe 53 to vibrate in response thereto and to move a mirror 65 in the same manner as was described with reference to the mirror 26. The mirror 65 reflects a light beam from a suitable source 66 upon a polygon of mirrors 67 revolved by means of an adjustable speed motor 67a at a speed synchronous with the speed of the motor 61 so that the amplitude and uniformity of the vibrations of the diaphragm 64 may be visibly observed.

As is well known in the art, each gaseous medium, variable as to density, temperature, etc., is resonant to pressure waves or sound waves of predetermined frequency. Thus by varying the speed of operation of the motor 61 until the pressure impulse created by the diaphragm 57 makes one round trip (or multiple thereof) to the diaphragm 64 and back to the diaphragm 57 in time to just synchronize with the next impulse created by the diaphragm 57, the pattern described by the beam of light on the mirrors 67 will show maximum amplitude, and noting the frequency of the impulses produced upon the diaphragm 57 (that is, noting the speed of the motor 61) the velocity of the sound through this particular gaseous medium may be readily determined by comparing this frequency with the frequency at which a condition of perfect resonance is achieved in the pipe 53 with air in it.

It will therefore be observed that I have provided a method of determining the location of obstructions in wells and accurately locating and measuring the fluid level in a well without the necessity of removing any of the apparatus from the well, the entire measurement and determination being accomplished in a relatively short time.

It will be understood by those skilled in the art that the creation of pressure impulses within the well may be accomplished by decreasing the pressure in the well instead of admitting a charge of gas from the pressure chamber 12 into the well. For example, if the pressure in the well is relatively high, the valve 16 in the pressure chamber may be closed and the valve 14 opened, allowing the pressure in the chamber 12 to reduce to some value less than the casing head pressure of the well. Then by closing valve 14, and opening valve 16 a measured quantity of gas will rapidly discharge or surge into the chamber 12, creating a pressure impulse within the well which acts in the same manner as hereinbefore described for the introduction of pressure from the tank or other source 11.

It will also be understood that if desired special constrictions may be placed in the well for future measurements of the fluid level therein to take the place of the tubing catcher 9. Such constrictions could comprise a closed cylinder of pipe surrounding and attached to one of the tubing sections when the tubing is run into the well and by noting and recording the location of such constriction, the future measurements of the fluid level by my pressure impulse method can be readily determined, employing the reflection of the wave from the restricting member in place of the reflection from a tubing catcher 9 or other restriction in the well.

While I have shown and described the preferred embodiment of my invention, I do not desire to be limited to any of the details of construction shown and described herein, except as defined in the appended claims.

I claim:

1. The method of accurately determining the unknown location of an obstruction in a well having a string of tubing therein constructed of a plurality of lengths of tubing, each of approximately the same length and connected to each other by couplings, which consists in creating a pressure impulse in the annular space between the tubing and casing of the well, registering the echoes from the tubing collars and from said obstruction, and counting the tubing collar echoes occurring between the creation of the pressure impulse and the echo from the unknown obstruction, to determine the location of the unknown obstruction.

2. The method of determining the unknown location of an obstruction in a well having a string of tubing therein, which consists in creating an acoustical impulse in the annular space between the tubing and the well casing to produce echoes from portions of the tubing string distinguishable from each other and from the echo from the unknown obstruction, observing the lapse of time between the arrival at a predetermined point of the echoes from successive portions of the tubing string to thereby determine the velocity of the pressure wave through the particular well under measurement, and measuring the lapse of time between the creation of the pressure impulse and the arrival at said predetermined point of the echo from the unknown obstruction.

3. The method of determining the unknown location of an obstruction in a well having a string of tubing therein, which consists in creating an acoustical impulse in the annular space between the tubing and the well casing of such magnitude as compared with the depth of the well and the resistance to pressure wave transmission therethrough as will produce echoes from portions of the tubing string distinguishable from each other and from the echo from the unknown obstruction, observing the lapse of time between the arrival at a predetermined point of the echoes from successive portions of the tubing string to thereby determine the velocity of the pressure wave through the particular well under measurement, and measuring the lapse of time between the creation of the pressure impulse and the arrival at said predetermined point of the echo from the unknown obstruction.

4. The method of determining the unknown location of an obstruction in a well having a casing with tubing therein restricting the volume of the annular space within the casing and having another obstruction therein at a known location above the unknown obstruction, which consists in creating in the annular space an acoustical impulse to produce echoes from different obstructions distinguishable from each other, observing the time lapse between the creation of the impulse and the arrival at a predetermined point of the echo from the known obstruction, comparing with said time lapse the time lapse between the creation of the impulse and the arrival at said predetermined point of the echo from the unknown obstruction.

5. The method of determining the unknown location of an obstruction in a well having a casing with tubing therein restricting the volume of the annular space within the casing and having another obstruction therein at a known location above the unknown obstruction, which consists in creating in the annular space an acoustical impulse of such magnitude as compared with the depth of the well and the resistance to pressure wave transmission therethrough as will produce echoes from different obstructions distinguishable from each other, observing the lapse of time between the creation of the impulse and the arrival at a predetermined point of the echo from the known obstruction to thereby determine the velocity of the pressure wave in that particular well, and measuring the lapse of time between the creation of the impulse and the arrival at said predetermined point of the echo from the unknown obstruction.

6. The method of determining the unknown location of an obstruction in a well, which consists in placing another obstruction in the well at a known depth in the well, creating a pressure impulse in the well, observing the lapse of time between the creation of the pressure impulse and the arrival at a predetermined point of the echo thereof from the obstruction of known location, and measuring the lapse of time between the creation of the pressure impulse and the arrival at said predetermined point of the echo from the unknown obstruction.

7. The method of determining the unknown location of an obstruction in a well having a casing with tubing therein restricting the volume of the annular space within the casing and having an approximately known depth and a known pressure of gas within said space, from which the approximate magnitude of acoustical impulse required to traverse the restricted space and produce echoes from the several obstructions in the well may be estimated, which consists in introducing into said space between the casing and tubing a series of acoustical impulses, each of different magnitude approximating the estimated magnitude to produce from each impulse echoes from the different obstructions in the well, observing the echoes that are produced by each impulse to select the one that produces distinguishable echoes from each of the obstructions in the well, and recording the echoes of an impulse of the selected magnitude in the relative times and order in which they are received at the ground surface.

8. The method of determining the unknown location of an obstruction in a well having a string of pipe therein consisting of sections of known mean length connected by couplings, which consists in creating an impulse in the well adapted to produce an echo from each of a plurality of successive couplings and from the obstruction of unknown location, and sequentially registering the impulse and such echoes in spaced relation to each other proportional to the actual relative spacing of the couplings and the unknown obstruction, and computing the distance to the unknown obstruction from said known mean length between successive couplings and the number of registered coupling echoes.

9. The method of determining the distance to an unknown location of an obstruction in a well having a casing with tubing therein restricting the volume of the annular space within the casing and having another obstruction therein at a known location, which consists in creating at some known point within the casing an impulse to produce echoes from said obstructions distinguishable from each other, sequentially registering the impulse and the echoes from said obstructions in spaced relation to each other, and determining the distance to the unknown obstruction from said known point of impulse by comparing the elapsed time between the registrations of the impulse and the echo from the known obstruction with the elapsed time between the registrations of the impulse and the echo from the unknown obstruction.

CRANFORD P. WALKER.